(12) United States Patent
Miranda et al.

(10) Patent No.: US 10,590,887 B2
(45) Date of Patent: Mar. 17, 2020

(54) SPARK EXCITER OPERATIONAL UNIT

(71) Applicant: Alphaport, Inc., Cleveland, OH (US)

(72) Inventors: Anthony J. Miranda, Hinckley, OH (US); John Heese, Akron, OH (US)

(73) Assignee: Alphaport, Inc., Cleveland, OH (US)

( * ) Notice: Subject to any disclaimer, the term of this patent is extended or adjusted under 35 U.S.C. 154(b) by 334 days.

(21) Appl. No.: 15/600,255

(22) Filed: May 19, 2017

(65) Prior Publication Data

US 2017/0335802 A1    Nov. 23, 2017

Related U.S. Application Data

(60) Provisional application No. 62/339,538, filed on May 20, 2016, provisional application No. 62/339,521, filed on May 20, 2016.

(51) Int. Cl.
| | |
|---|---|
| *F02K 9/95* | (2006.01) |
| *H01T 4/10* | (2006.01) |
| *H01T 15/00* | (2006.01) |
| *H01T 14/00* | (2006.01) |

(52) U.S. Cl.
CPC .................. *F02K 9/95* (2013.01); *H01T 4/10* (2013.01); *H01T 14/00* (2013.01); *H01T 15/00* (2013.01); *F05D 2220/80* (2013.01)

(58) Field of Classification Search
CPC ..................................... F02K 9/95; H01T 4/10
See application file for complete search history.

(56) References Cited

U.S. PATENT DOCUMENTS

| | | | |
|---|---|---|---|
| 6,603,216 B2 | 8/2003 | Costello | |
| 6,779,335 B2 * | 8/2004 | Herdy, Jr. ............... | C06B 47/04 60/205 |
| 8,046,987 B2 | 11/2011 | Wilmot et al. | |
| 8,534,041 B2 | 9/2013 | Mee et al. | |
| 8,622,041 B2 | 1/2014 | Suckewer et al. | |
| 8,653,693 B2 | 2/2014 | Aulisio et al. | |
| 8,664,872 B2 | 3/2014 | Fukuda et al. | |
| 8,766,095 B2 | 7/2014 | Kenworthy et al. | |
| 8,786,392 B2 | 7/2014 | Burrows | |
| 8,839,600 B2 | 9/2014 | Vermeulen et al. | |
| 8,893,504 B2 | 11/2014 | Vigneron et al. | |
| 9,013,856 B2 | 4/2015 | Mahajan et al. | |

(Continued)

OTHER PUBLICATIONS

"Spark Ignition Characteristics of a LO2/LCH4 Engine at Altitude Conditions," Kleinhenz, Julie, Charlies Sarmiento and William Marshall, American Institute of Aeronautics and Astronautics, Jul. 30 to Aug. 1, 2012 (Year: 2012).*

(Continued)

*Primary Examiner* — Scott Bauer
(74) *Attorney, Agent, or Firm* — Emerson, Thomson & Bennett, LLC; Roger D. Emerson

(57) ABSTRACT

A hardware configuration and related control strategy is disclosed that accepts an electric power input typical of space flight systems and converts that energy into a spark pulse train with fixed/predetermined performance metrics for the following system parameters: time to first spark, peak breakdown voltage amplitude, spark repetition rate and energy delivered per spark, which have all been optimally chosen to reliably ignite certain fuel mixtures, which have been proven to be beneficial for use in aerospace applications.

17 Claims, 10 Drawing Sheets

(56) References Cited

U.S. PATENT DOCUMENTS

| | | | |
|---|---|---|---|
| 9,112,335 B2 | 8/2015 | Kenworthy | |
| 9,115,890 B2 | 8/2015 | Zagoroff | |
| 9,121,377 B2 | 9/2015 | Ishimatsu | |
| 9,135,755 B2 | 9/2015 | Youssef | |
| 9,151,245 B2 | 10/2015 | Kawadu et al. | |
| 9,160,148 B2 | 10/2015 | Kyuno | |
| 9,166,381 B2 | 10/2015 | Hayashi et al. | |
| 9,236,807 B2 | 1/2016 | Jin et al. | |
| 9,263,857 B2 | 2/2016 | Nakayama et al. | |
| 9,331,599 B2 | 5/2016 | Al-Haddad et al. | |
| 2010/0115917 A1* | 5/2010 | Laine | F02K 9/50 60/258 |
| 2011/0181997 A1* | 7/2011 | Aulisio | F02K 9/95 361/253 |

OTHER PUBLICATIONS

NASA/TM 2012-217611 "Experimental Investigation of Augmented Spark Ignition of a LO2/LCH4 Reaction Control Engine at Altitude Conditions", Kleinhenz, Julie, Charles Sarmiento, and William Marshall, Jun. 1, 2012.

"Spark Ignition Characteristics of a LO2/LCH4 Engine at Altitude Conditions," Kleinhenz, Julie, Charles Sarmiento and William Marshall, American Institute of Aeronautics and Astronautics, Jul. 30 to Aug. 1, 2012.

\* cited by examiner

SPARK EXCITER OPERATIONAL UNIT

I. CROSS REFERENCE TO RELATED APPLICATIONS

The present application claims the benefit under 25 U.S.C. § 119(e) of U.S. Provisional Application No. 62/339,538 filed on May 20, 2016 and of U.S. Provisional Application No. 62/339,521 filed on May 20, 2016, both of which are incorporated by reference in their entireties.

II. TECHNICAL FIELD

Provided is an electronic assembly that is capable of reliably initiating combustion of flammable substances and mixtures for uses including but not limited to propulsion systems for aerospace and other applications.

III. BACKGROUND

Use of hypergolic propellants to power rockets and other space and/or aircraft is relatively common within the industry. Such propellants typically consist of a fuel (e.g., hydrazine) and an oxidizer which spontaneously ignite when they come into contact with each other. One advantage of hypergolic fuel systems are that ignition systems are not required or used for ignition and combustion of hypergolic propellants. Hypergolic fuel systems, however, can be extremely toxic and corrosive both to the propulsion system and to the environment. For this reason, the space industry is moving towards use of "green" propellants that will enable safer, more cost-effective space flight. "Green propellants" or "green fuels" are not hypergolic or toxic and offer a higher return on investment in not requiring ground support equipment and significant time for delivery and filling of fuel within the propulsion system.

The benefits of using "green" fuels within propulsion and other mechanical systems are significant in that they offer higher energy output per weight and improved ignition reliability when paired with a compatible spark exciter unit. Consequently, "green" fuels also require less storage space than that which is required for other conventional fuels.

Relative to the standard hypergolic fuels such as hydrazine, these "green" fuel mixtures are more difficult to ignite reliably and require much more energy to ignite and to burn. What is therefore needed within the industry is an improved spark exciter system which is capable of consistently initiating combustion of various types of "green" fuels.

NASA Glenn Research Center has published the results of a test of several potential spark exciter systems, and established that a spark exciter system that is capable of reliably igniting and sustaining combustion of a "green" fuel mixture of liquid oxygen and liquid methane ($LO_2/LCH_4$) requires approximately 200-300 sparks per second, each with 55-75 mJ of energy delivered per spark, a breakdown voltage on the order of 9-10 kV, and a deterministic and repeatable time to first spark. However, current commercially available spark exciters have not been able to consistently achieve ignition with sufficient reliability for aerospace applications.

The present disclosure provides a spark exciter system capable of reliably igniting non-hypergolic and "green" fuels in aerospace applications. Such applications may include various components of aerospace propulsion systems such as "green fuel" rocket emission systems, thruster systems, etc. Other applications for the spark exciter system include, but are not limited to, flight systems such as aircraft engines, race cars and other landcraft engines, systems used within the oil and gas industry, power turbines, watercraft engines, etc.

IV. SUMMARY

Provided is a spark exciter operational unit that is capable of reliably initiating non-hypergolic combustion of green fuels for space flight and other applications.

Also provided is a corresponding method for using a spark exciter operational unit to reliably initiate non-hypergolic combustion of green fuels for space flight and other applications.

According to one aspect of the present disclosure, a spark exciter operational unit for a flight system is provided which includes an exciter assembly and an ignitor, wherein the spark exciter operational unit includes: (1) an input connector for receiving an electrical current and a (2) a DC-DC electrical current converter, wherein the exciter assembly and ignitor generates sparks having a voltage, energy and frequency to reliably initiate ignition and combustion of non-hypergolic green fuels for space flight.

According to another aspect of the present disclosure, the input connector supplies an input voltage to the exciter assembly ranging from about 9 V to about 120 V.

According to a further aspect of the present disclosure, the output current ranges from about 6 kV to about 25 kV.

According to a further aspect of the present disclosure, the output breakdown current supplied to a spark gap within an igniter assembly is about 15 kV, the spark rate ranges from about 1 to about 300 sparks per second and the spark energy is between about 1 mJ to about 115 mJ.

According to a further aspect of the present disclosure, the exciter assembly includes a circuit board that receives input power from a power source, a filter to reduce conducted disturbances, a timing circuit, a power converter and a driver; the ignitor includes a capacitor, a spark plug and a spark gap; the flyback transformer is positioned between the exciter assembly and the ignitor, wherein the flyback transformer includes a primary end and a secondary end, wherein the secondary end of the transformer is connected in series with the capacitor and the spark gap and is used to generate a breakdown voltage across the spark gap to ignite the spark plug.

According to a further aspect of the present disclosure, the timing circuit controls the operation and function of the power converter which charges the capacitor within the ignitor and the timing circuit controls the operation and function of the driver which provides an electrical power pulse to the transformer.

According to a further aspect of the present disclosure, the output breakdown current supplied to a spark gap within an igniter assembly is about 15 kV, the spark rate is about 100 sparks per second and the spark energy is about 70 mJ.

According to a further aspect of the present disclosure, the output breakdown current supplied to a spark gap within an igniter assembly is about 15 kV, the spark rate is about 260 sparks per second and the spark energy is about 50 mJ.

According to a further aspect of the present disclosure, the output breakdown current supplied to a spark gap within an igniter assembly is about 15 kV, the spark rate is about 110 sparks per second and the spark energy is within the range of about 12 to about 100 mJ.

According to a further aspect of the present disclosure, the output breakdown current supplied to a spark gap within an igniter assembly is in the range of about 0.1 kV to about 18 kV, the spark rate is in the range of about 11 to about 100 sparks per second and the spark energy is within the range of about 12 to about 100 mJ.

According to a further aspect of the present disclosure, the non-hypergolic fuel that is ignited is a mixture of $LO_2$ and $LCH_4$.

According to a further aspect of the present disclosure, the non-hypergolic fuel that is ignited is a mixture $N_2O$ and Propylene ($C_3H_6$).

According to a further aspect of the present disclosure, the non-hypergolic fuel that is ignited is a mixture of $N_2O$ and Propane ($C_3H_6$).

According to a further aspect of the present disclosure, the non-hypergolic fuel is ignited at a pressure in the range of about 1 Torr to about 100 Torr.

Also provided is a method of converting an electrical input within a spark exciter operational unit to an electrical output. The method includes the following steps: sending an electrical current from a power source to the exciter assembly allowing the circuit board of the exciter assembly to receive an input current which ranges from about 9V to about 120V; passing the electrical input through the timing circuit within the exciter assembly; allowing the timing circuit to turn on the power converter; allowing the power converter to charge the capacitor; allowing the timing circuit to initiate operation of the driver; allowing the driver to send an electrical input to the transformer which outputs an electrical current to the ignitor in the range of about 6 kV to about 25 kV.

According to a further aspect of the present disclosure, the electrical input received from the power source is passed through a filter to reduce conducted disturbances.

According to a further aspect of the present disclosure, the electrical input is passed through the filter prior to the electrical input being passed through the timing circuit.

According to a further aspect of the present disclosure, the timing circuit controls the operation and function of the power converter which charges the capacitor within the ignitor and wherein the timing circuit controls the operation and function of the driver which provides an electrical power pulse to the transformer.

According to a further aspect of the present disclosure, after the capacitor is charged by the power converter, the timing circuit initiates controlled operation of a driver.

According to a further aspect of the present disclosure, the transformer and capacitor are discharged in conjunction within the ignitor to generate the breakdown voltage across the spark gap to initiate ignition of the spark plug and combustion of the non-hypergolic green fuel.

V. BRIEF DESCRIPTION OF THE DRAWINGS

VI. DETAILED DESCRIPTION

Figure 1:
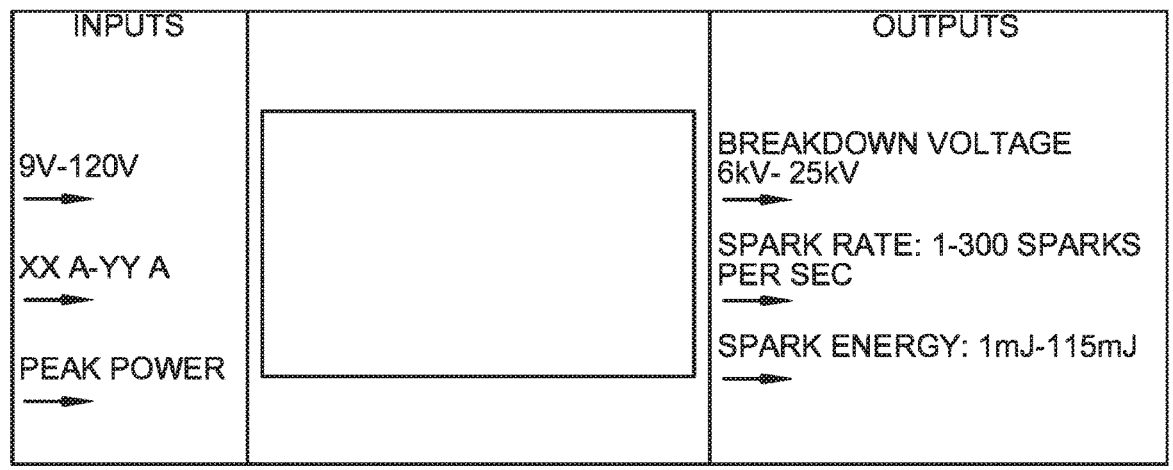
FIG. 1 is a block diagram showing possible input and output values of an exemplary spark exciter unit for igniting green propellants in aerospace applications. As shown, when DC power is applied to the spark exciter unit, a spark pulse train is generated with fixed performance specifications within the ranges shown in the figure.

Provided herein is a spark exciter system capable of igniting non-hypergolic fuel mixtures. The spark exciter system of the present disclosure incorporates the electrical components of the exciter near the assembly which houses the igniter.

The spark exciter system disclosed herein may be used with "green" fuels. Non-limiting examples of "green" fuels which may be used within the present spark exciter system include liquid oxygen-hydrogen ($LO_2/LH_2$), liquid oxygen-methane ($LO_2/LCH_4$), nitrous oxide propane ($N_2O/C_3H_8$), and other liquid hydrocarbons ($LO_2$/hydrocarbon).

As mentioned above, these "green" fuels are more difficult to ignite and burn in a consistent manner since higher energies are required to produce higher heat for ignition and combustion. The higher energies input (including higher spark energy) establishes the reliability necessary for igniting and combusting "green" fuels. As such, an improved ignition/igniter system is needed which is capable of providing improved time to first spark repeatability, spark repetition rate, energy delivered per spark and maximum applied breakdown voltage. The present spark exciter system is capable of providing these functions for reliable combustion of "green" fuels in a consistent and continuous manner for the increased ignition temperatures required for initiating combustion of "green" fuels as compared to the ignition temperature of conventional fuels. The present spark exciter system provides a higher spark rate which is capable of not only igniting "green" fuels, but also, different combinations of "green fuels". Also, as mentioned above, the advantage of using the present spark exciter system for combusting "green" fuels is that "green" fuels are more dense and energy potent. Thus, less space is needed to store "green" fuels within the vehicle or other mechanical device for operation than that which would be needed to store conventional fuels which would provide an equivalent amount of power.

The present spark exciter achieves this objective through the use of a control strategy (also referred to herein as a "control system") integrated within the spark exciter electronics design. An example of a previous spark exciter electronics design is disclosed within U.S. Pat. No. 8,653,693 which is herein incorporated by reference in its entirety. The components of the present spark exciter which allow for the implementation of the control strategy include a power source, an electronic filter, a driver (also referred to herein as a "driver circuit", a timing sequence (also referred to herein as a "timing circuit"), a power converter, a flyback transformer, an energy storage capacitor, and an igniter (for example, a spark plug). The electrical components may be integrated within a single or multiple electrical boards. In certain embodiments, the electronic components are integrated within a single electrical board. In certain embodiments, the electronic components are integrated into an enclosure which is operated within a vacuum environment. The unit is compact in nature and efficiently transfers energy to a given spark gap. The unit is designed to provide a fixed frequency spark rate with controlled spark energies and is designed to NASA supplied specifications for space operation of flight systems.

Figure 2:
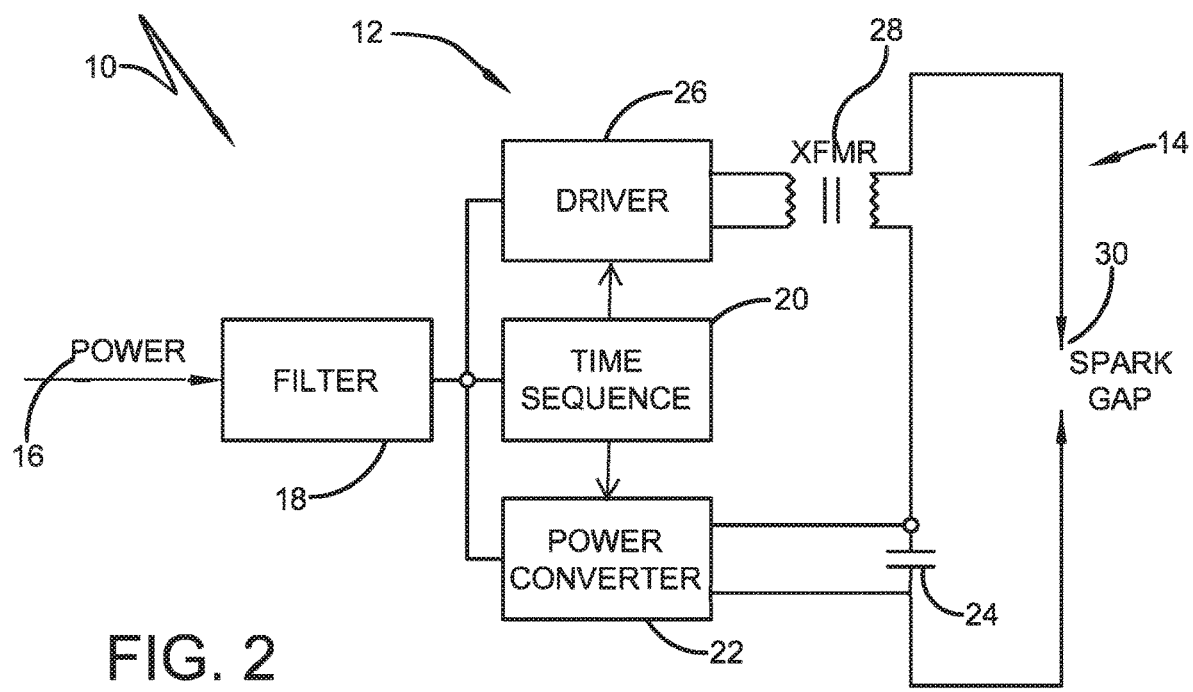
FIG. 2 is a system diagram showing the hardware configuration and circuit topology of an exemplary embodiment of a spark exciter for igniting green propellants for space flight.
Figure 3:
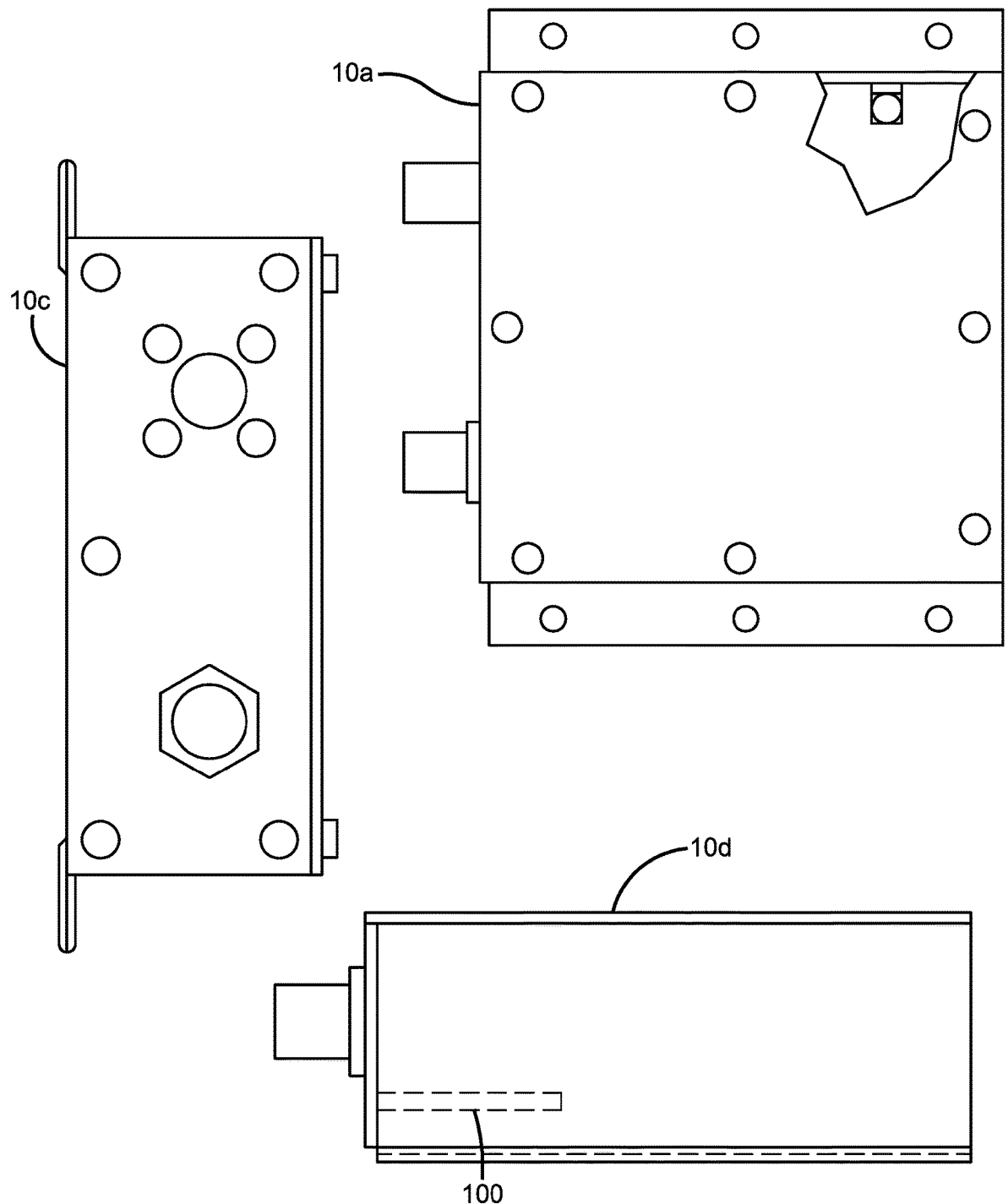
FIGS. 3 through 7 are technical drawings of an exemplary spark exciter assembly, which illustrate the housing that encloses the exciter circuitry.
Figure 4:
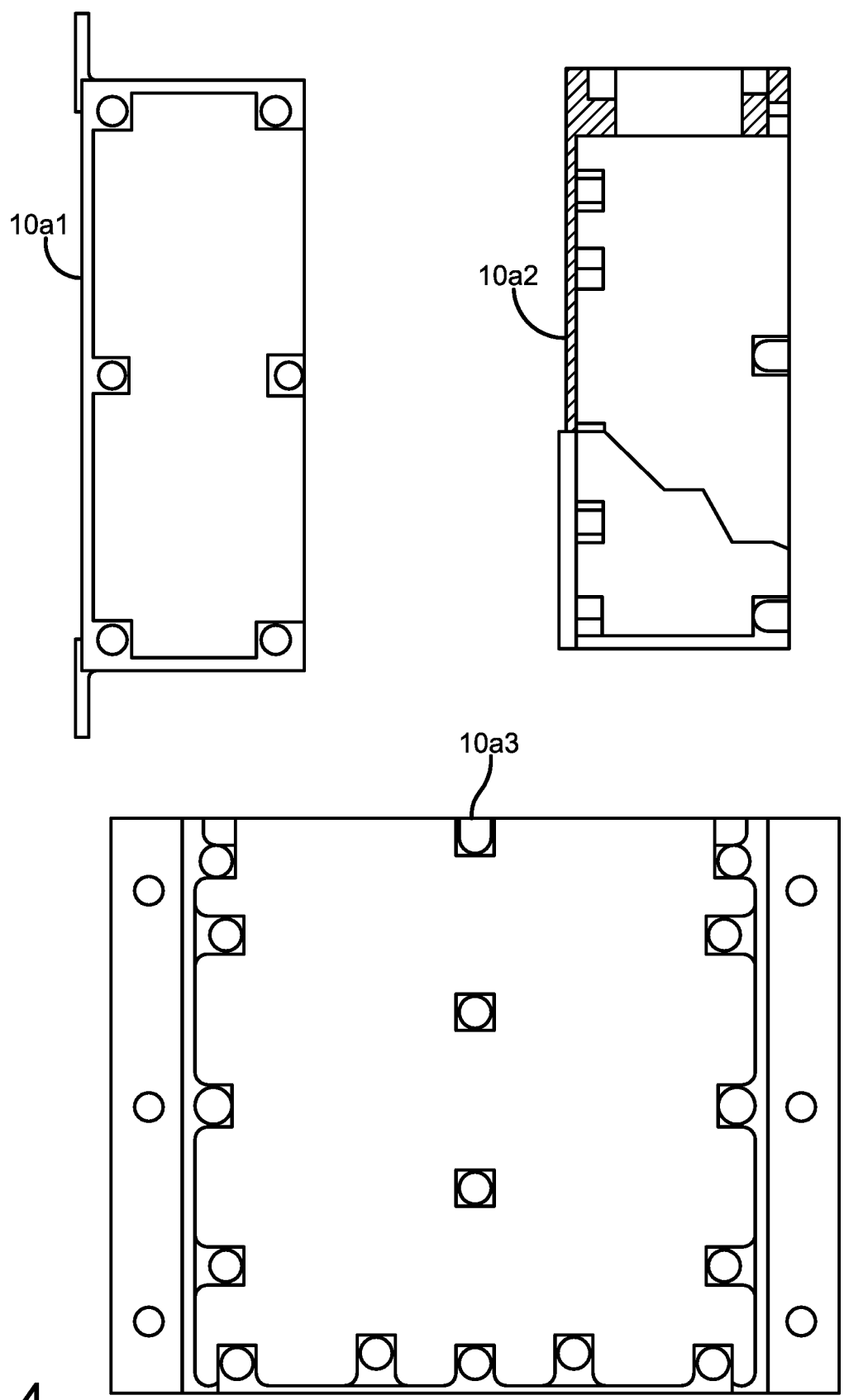
Figure 5:
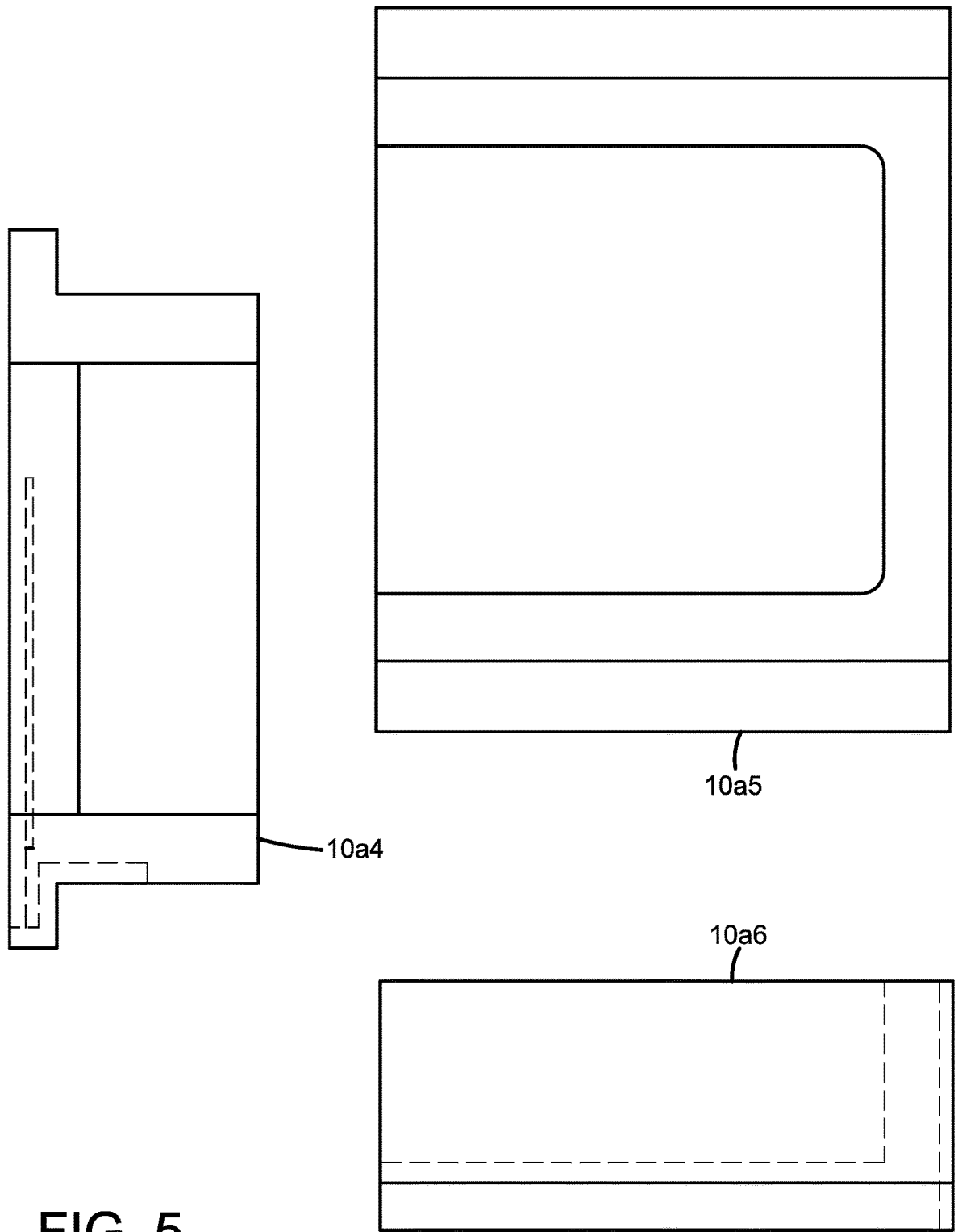
Figure 6:
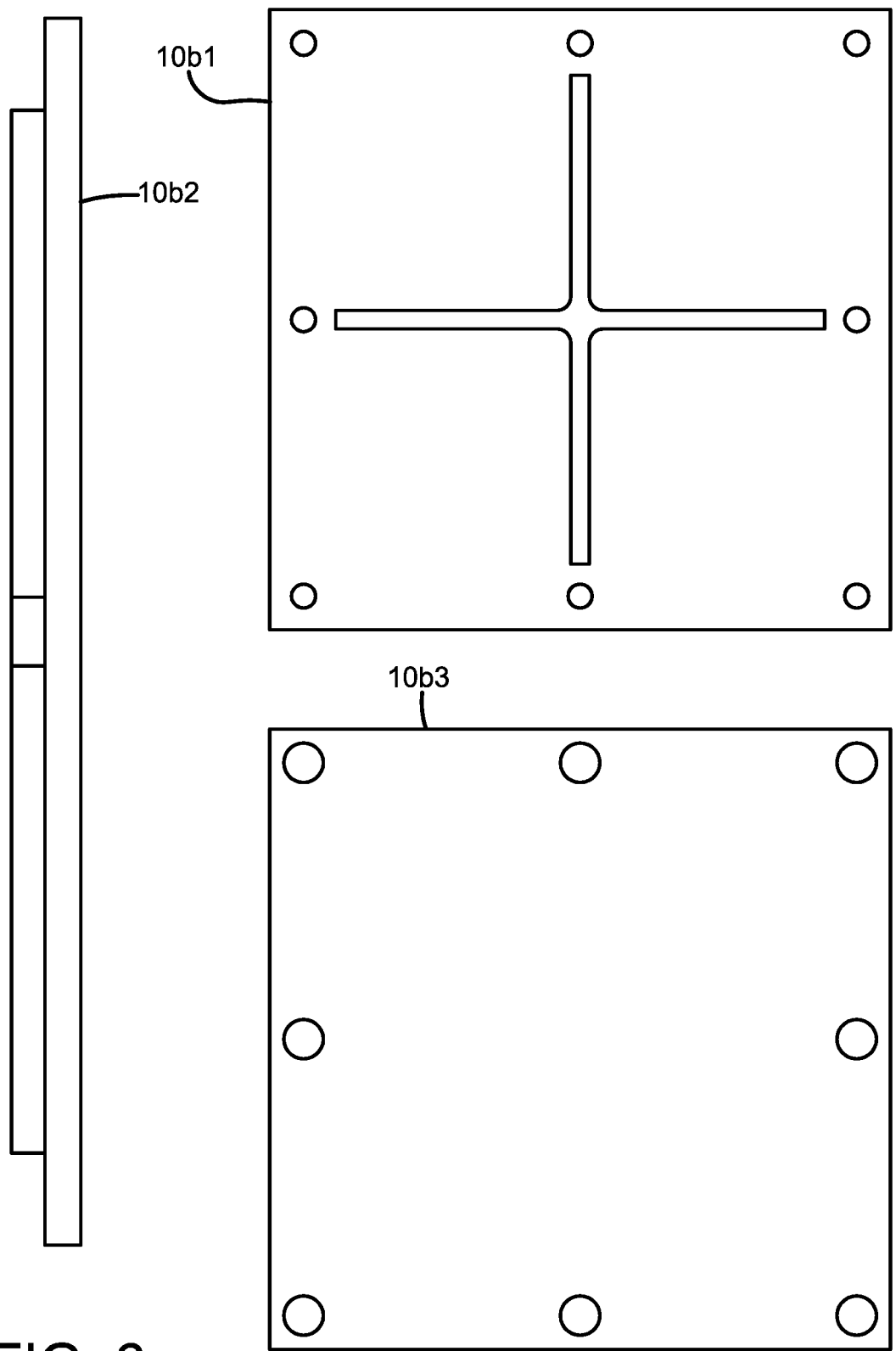
Figure 7:
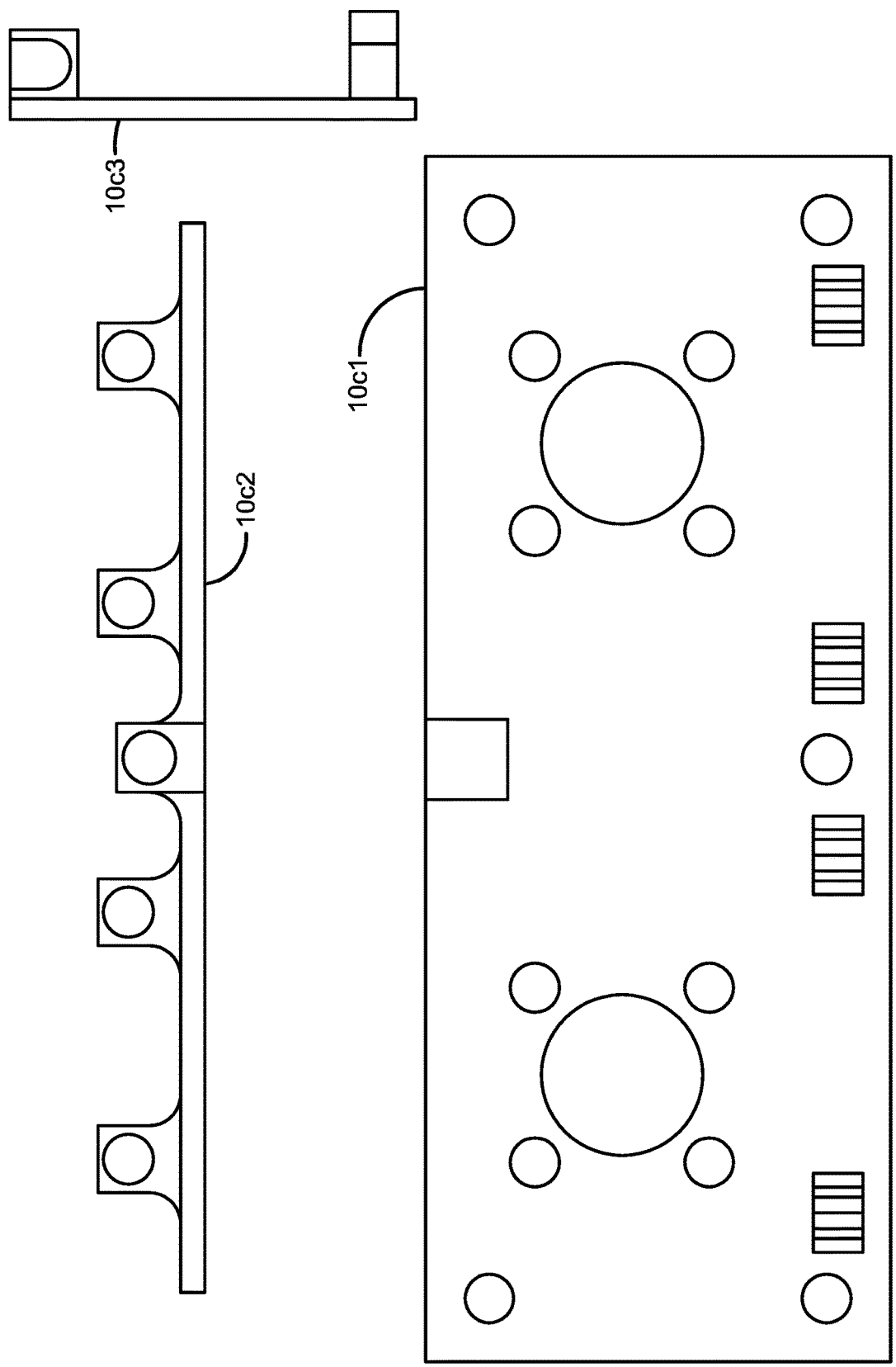

Referring to FIG. 2, the spark exciter (10) includes an exciter assembly (12) and an igniter (14). An example of an igniter may be a spark plug although it should be understood that any type of igniter or spark plug may be used with the system. The embodiment of the exciter assembly (12) shown (also referred to herein as the "electronic assembly") includes a circuit board that first receives input power from a power source (16), filters the power which is received to reduce conducted disturbances, and powers several downstream circuits. The exciter (12) also includes a timing circuit (20). The timing circuit (20) runs a power converter (22). The timing circuit (20) also controls the operation of a driver (26) which is used to provide an electrical power pulse to a transformer (28). The transformer includes a primary and a secondary winding which is used to generate the breakdown voltage across the spark gap. The secondary end of the transformer (28) is connected in series with the energy storage capacitor (24) and the spark gap. The energy storage capacitor (24) is connected across and charged by the power converter (22). During operation, the exciter driver circuit (26) sends a voltage pulse to the primary of the flyback transformer (28). When the driver pulse is terminated, the magnetic field in the transformer core rapidly decreases and voltages related to the turns number are generated across the primary and secondary windings. The series connection of the capacitor and transformer secondary causes the sum of the voltages to appear across the gap. This generates a high voltage pulse that is sufficient to cause breakdown to occur across the gap and an arc or plasma to be generated. The low impedance plasma effectively closes the gap and creates a current loop path that allows the energy storage capacitor to discharge through the secondary of the transformer, transferring the capacitor energy to the spark gap and initiating the ignition process. Repeated spark generation and ignition of the air/fuel mixture ensures that combustion is maintained throughout the engines operation.

The spark exciter assembly may be integrated with the igniter within a single assembly or enclosure or alternatively, the exciter assembly and the igniter may consist of two separate electrically connected components. The exciter assembly may be designed in any shape required for a particular application. In certain embodiments, the exciter assembly may be designed to be rectangular in shape. Although the positioning and design of the various components of the exciter assembly as well as the igniter have been described above, it is understood that a person of ordinary skill in the art may develop alternative designs of the exciter and igniter units and may position the various components described above anywhere with respect to the circuit board depending upon any specifications that may be required for a particular application.

In the end application, the power input for the spark exciter originates from a power source from a vehicle or other electrical equipment. The power source may stem from a battery, an alternator, a generator or any other power source suitable for use within the art. In certain embodiments, the power input may be a direct current (DC) input originating from a DC power source. The power source may be run at any voltage suitable for use within the art. In certain embodiments, the power source may be run between about 9 to about 50 volts. In further embodiments, the power source may be run between about 24 and about 32 volts (28Vdc nominal).

The present exciter system shown in FIG. 2 is run from a DC power source. However, the exciter system of the present disclosure also encompasses designs capable of accepting an alternating current (AC) power input which originates from an AC power source. Thus, in certain embodiments, the power source may also be generated from an AC power source.

After electrical power is received from a source within the exciter assembly (12), it is passed through a filter (18) to reduce conducted disturbances. The filter may encompass any component suitable for use within the art as a filter. Examples of component devices which may be used as filters include but are not limited to inductors, capacitors, diodes, current limiters, inrush current limiters, resistors and combinations thereof.

After current passes through the filter it is run to the driver circuit (26), the timing circuit (20) and the power converter (22). The timing sequence circuit controls the operation/function of the transformer driver and the power converter circuits. The power converter is first turned on to charge the capacitor, then the power converter is shut down. The driver circuit then sends a pulse to the transformer to initiate the fly-back voltage that causes a high voltage pulse and breakdown at the spark gap location. The stored capacitor energy is then dissipated at the spark gap until it is depleted. The process includes some additional delays as needed, but this pattern will repeat as long as power is applied to the spark exciter unit.

In certain embodiments, the capacitor is capable of storing about 300V although the storage capacity of the capacitor may vary depending on the type of capacitor used within the spark exciter system and the ignition and combustion requirements for the particular fuel that is being used. Once the electrical current is discharged from the transformer, it is combined with the current discharged from the capacitor to bridge the spark gap. Thus, in one embodiment described herein, about 15,000V originating from the transformer is combined with about 300V originating from the capacitor to fill the spark gap (30). This current will cause the spark gap (30) to arc and break down plasma to generate. The plasma will function as a conductor, closing the loop within the circuit. As current flows through the spark gap (30), the plasma and high temperature is maintained across the gap causing combustion of the air/fuel mixture. After the spark is generated, there is a delay. In certain embodiments, the timing circuit may wait beyond the amount of time for the spark to end before it starts the process of respectively powering the capacitor and transformer again through the power converter and the driver. This process is repeated to provide continuous reliable ignition and combustion of the air/fuel mixture.

Through the timing circuit, the exciter assembly is able to provide variable spark rate capable of igniting and combusting "green" fuels. Typically the timing circuit allows the spark rate to be set anywhere from between about 1 to about 300 sparks per second. In certain embodiments, spark rate may be set to about 200 sparks per second while in other embodiments spark rate may range from about 1 to 110 sparks per second. The timing circuit and overall exciter system, however, may be set to generate any spark rate which is required for ignition and combustion of the specific "green" fuel being utilized within the system.

Thus, the timing of the spark rate is driven by the hardware of the exciter assembly (12) which includes the timing circuit, the driver, the power converter, the transformer and the capacitor. In general, these components within exciter assembly (12) include numerous resistors and capacitors which run the timing of the spark or ignition within the igniter. In particular, the timing circuit (20) includes various resistors and capacitors which first powers the power converter (22) to initiate the filling of an electrical potential within the capacitor (24), turns the power converter (22) off, initiates a brief delay and subsequently powers the driver (26) which in turn powers the transformer. A brief delay is introduced into the system as the capacitor (24) is discharged and the spark gap is broken down. The timing circuit (20) then reinitiates current flow to the power converter (22) to recharge the capacitor (24) and repeat the process over again. Thus, the system may be described as an analog electronic system which incorporates the use of a resistor-capacitor circuit. Time delays and constellations between the different components within the system are based on an RC time constant between the different components within the system. Briefly, the operation of components of the exciter assembly (12) as well as the timing circuit (20) can be described as follows. A first component within the exciter assembly (12) or timing circuit (20) will run for certain period of time and will initiate operation of the next component downstream from the first component. Once operation of the first component is complete, the second component will run for a certain period of time and initiate operation of the next component downstream from the first component. This process continues until operation of all the components within the cycle are completed. Once the cycle is complete, the circuit resets to begin the process over again.

As shown in the block diagram of FIG. 1, the spark exciter system of the present disclosure may have an input of about 9V to about 120V and an output breakdown voltage of about 6 kV to about 25 kV. Spark rate may range from about 1 to about 300 sparks per second and spark energy may range from about 1 millijoule (mJ) to about 115 mJ.

The present exciter assembly may be used to break down the gap of any igniter (e.g., any spark plug). It also provides a control strategy which is reliable in that it works repeatedly to produce relatively hot plasma compared to conventional igniter systems and sustains ignition rates of a specific number of sparks per second. In certain embodiments, the spark exciter is specifically designed for incorporation and operation of flight systems. In certain embodiments, the spark exciter is designed for use in propulsion systems for space craft. In such embodiments, the spark exciter may encompass an exciter electronic assembly which is directly mounted on a flight-qualified igniter. The spark exciter may therefore comprise a compact single unit to reduce ignition system complexity. As a single unit, the spark exciter eliminates the use of a corona-prone ignition cable to produce reliable sparks for ignition of "green" fuels such as liquid oxygen, liquid methane fuels ($LO_2$/$LCH_4$), nitrous oxide propane ($N_2O$/$C_3H_8$), or other $LO_2$/hydrocarbons. The spark exciter is capable of producing 50 to 120 millijoule of energy per spark at a rate of about 100 to about 300 sparks per second through the generation of a spark gap breakdown of up to about 18 kilovolts. In certain embodiments, the spark exciter may have the following parameter values or equivalents thereof—spark rate: 100 Hz; voltage input 24-32 VDC; peak spark potential 15 kV; and delivered energy 70 mJ.

Figure 8:
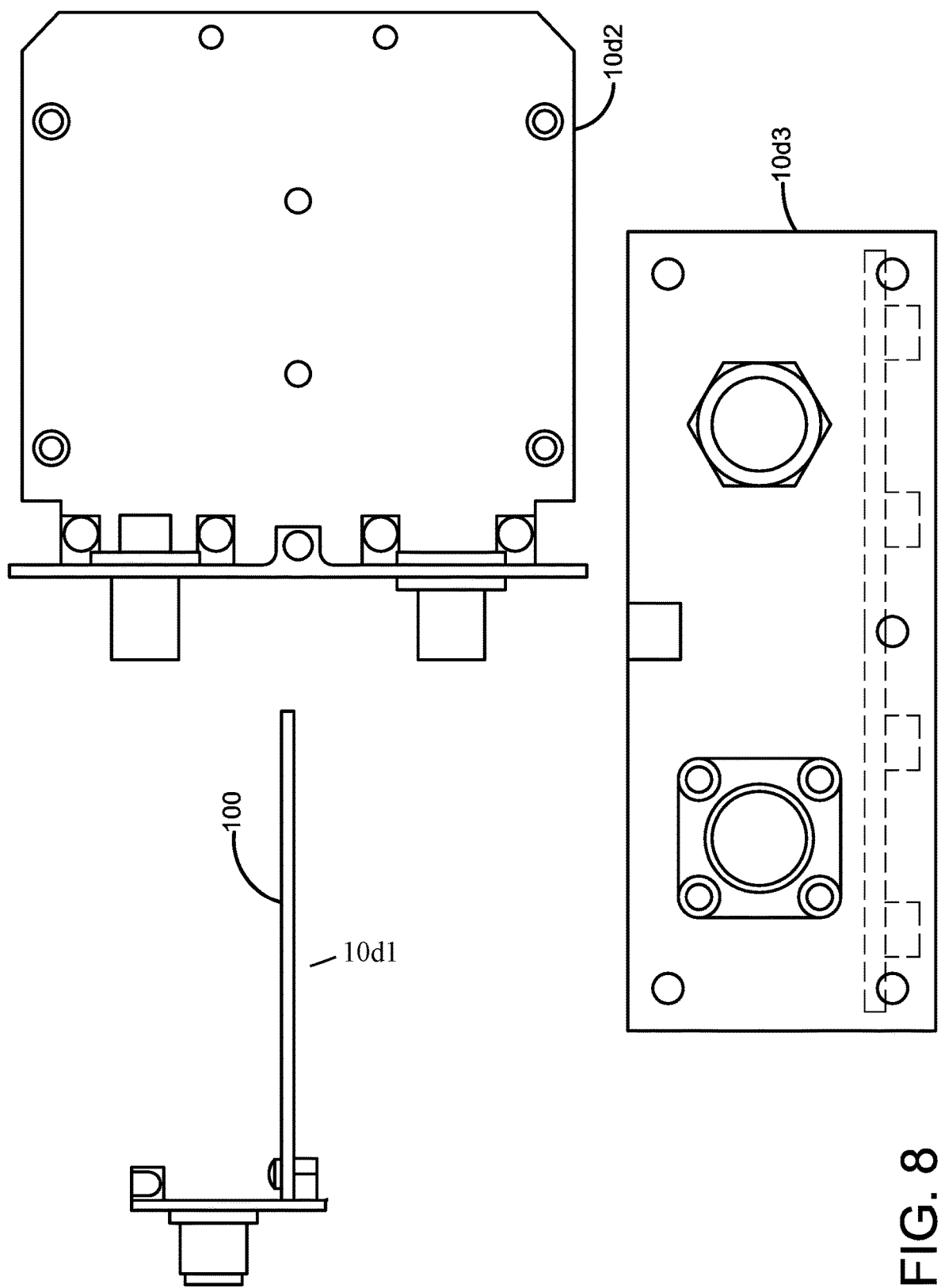
FIG. 8 illustrates an exemplary front panel with an electronic board, which contains the exciter circuitry.
Figure 9:
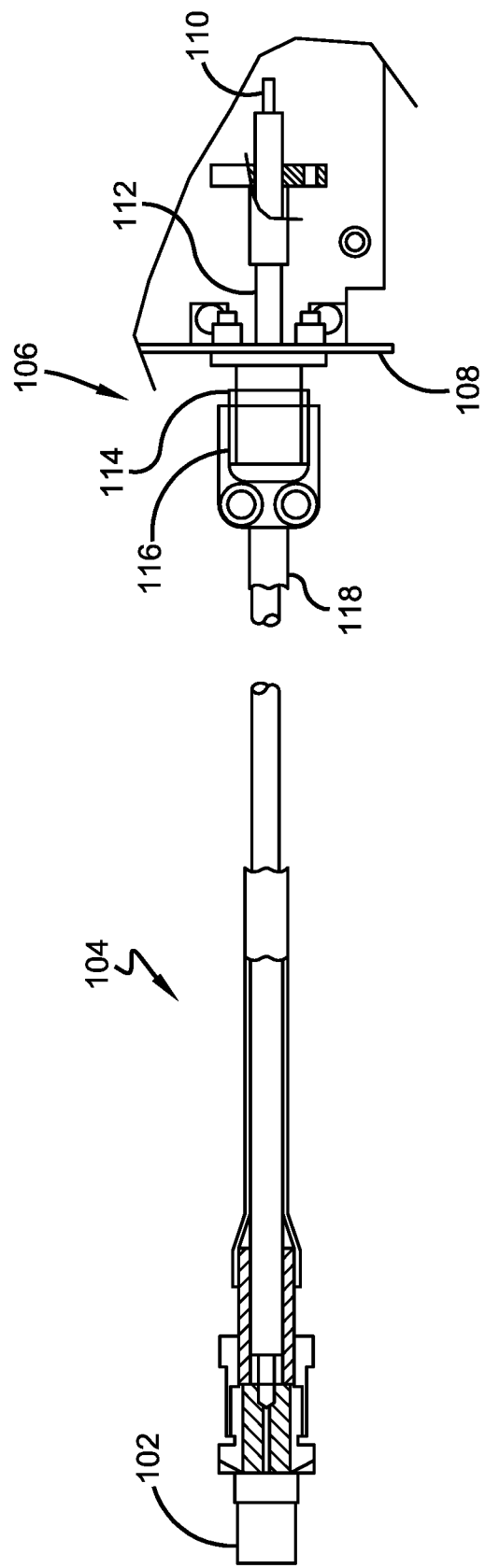
FIGS. 9 and 10 illustrate an exemplary high voltage spark driver cable, which can be utilized between the exciter unit and an igniter or other spark gap.
Figure 10:
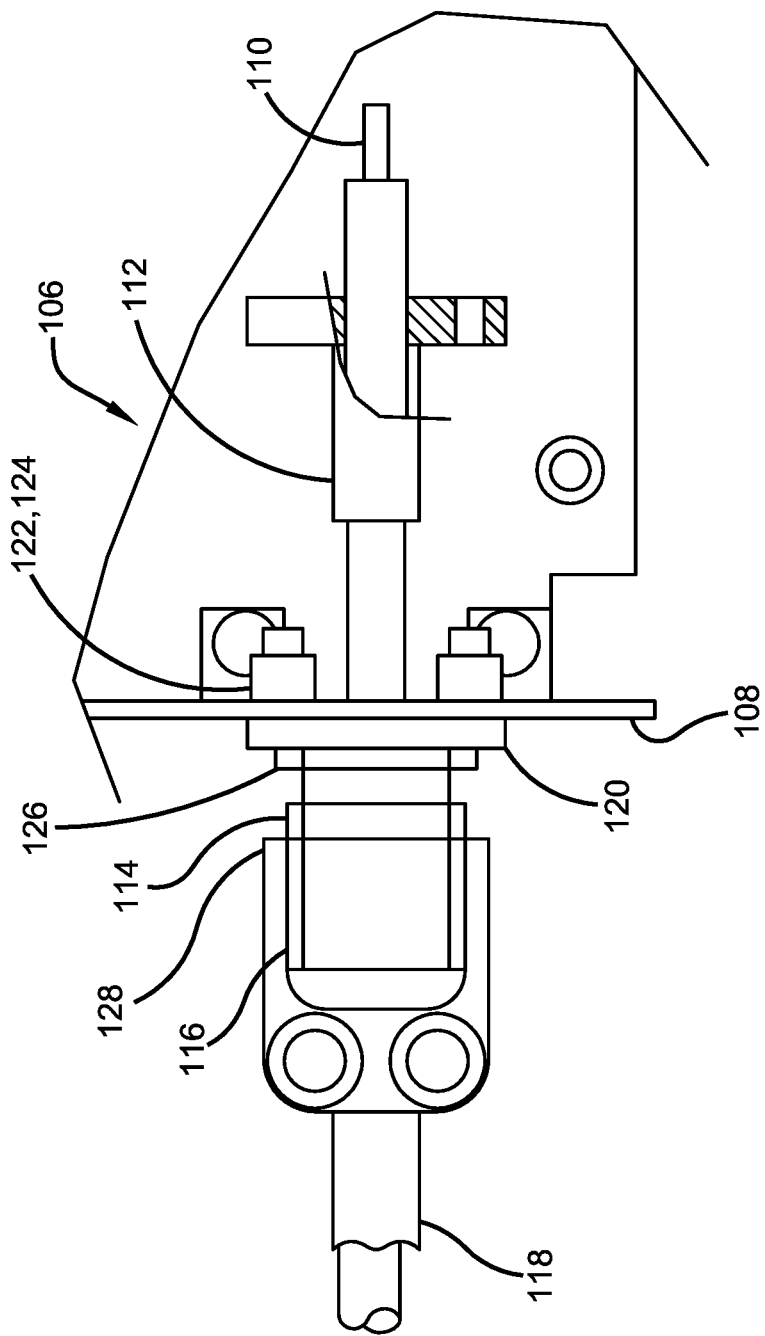
Figure 11:
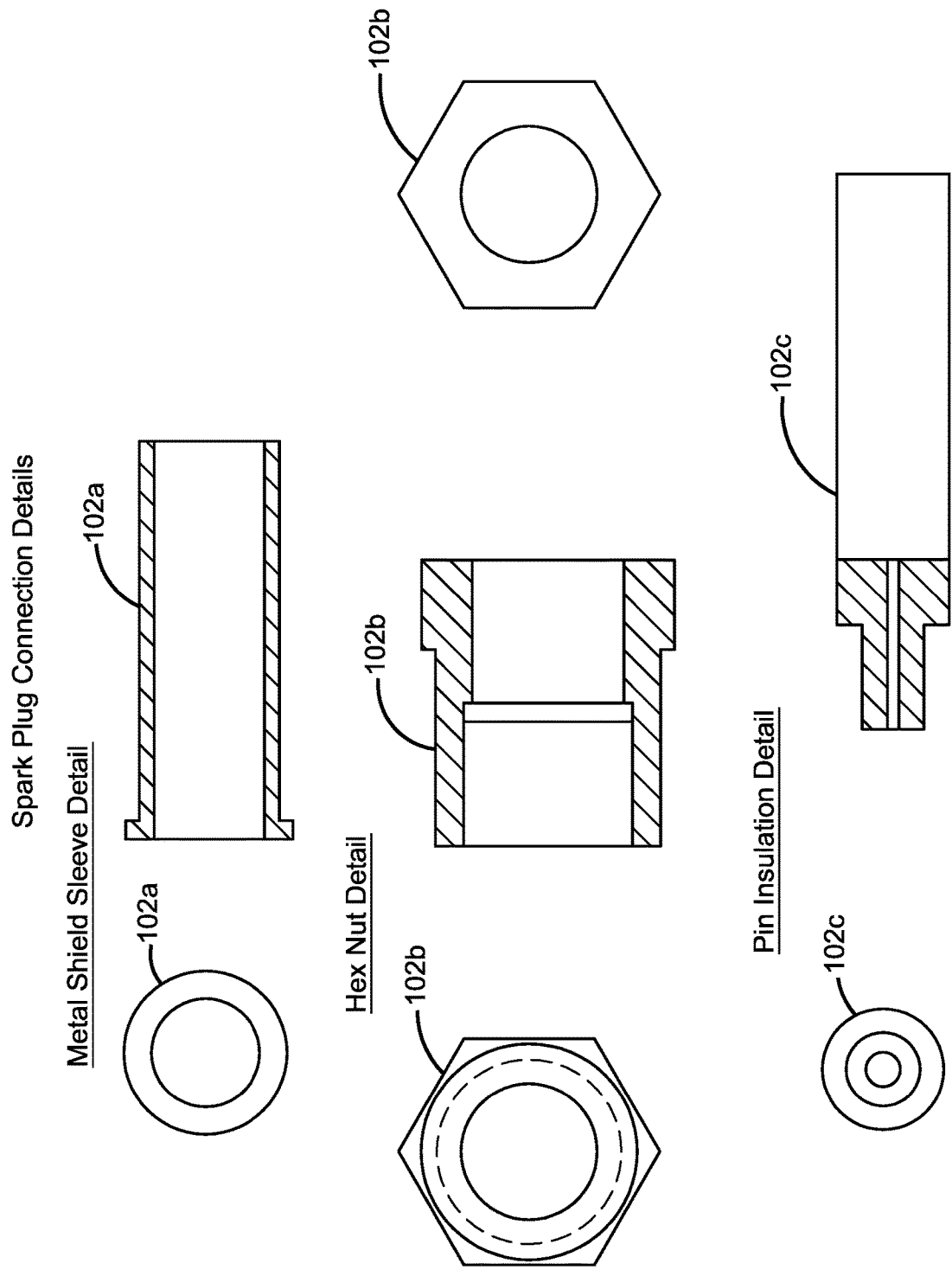
FIG. 11 illustrates an exemplary spark plug connection details for a spark exciter assembly.

FIGS. 3 through 7 are technical drawings of an exemplary spark exciter assembly which illustrate the various features of the housing which encloses the spark exciter assembly unit. The housing includes a bottom panel (10a), a top panel (10b), a front panel (10c) and a front panel including an electronic board assembly (10d). FIG. 8 illustrates an exemplary front panel and an electronic board assembly (10d) used for the spark exciter assembly. FIGS. 9 and 10 illustrate an exemplary high voltage spark driver assembly going to the igniter. The exciter/ignitor front panel connection (106) illustrated within FIGS. 9 and 10 include an excited/ignitor front panel electronic board assembly (108), electrical connection wire (110) and wire insulation (112) on a first end of the excited/ignitor front panel, a connector (114), braid termination (116) and braid and HV wire on a second end of the excited. Ignitor front panel electronic board assembly (108) which forms a first end of a spark plug connection (104) for connecting a spark plug (102). FIG. 10 further illustrates various hardware which may be used for assembling the excited/ignitor front panel electronic board assembly (108) including a locknut (122) and washer (124) on a first end of the exciter/ignitor electronic board assembly (108) and a front mount bulkhead (128), a flat washer (126) and a cap screw (120) on a second end of the electronic board assembly (108). FIG. 11 illustrates various hardware which may be used for connecting the spark plug to the assembly including a metal shield sleeve details (102a), a hux nut details (102b) and a PIN insulation details (102c).

The present exciter assembly may be set to accommodate the continuous ignition and combustion any type of "green" fuel that is being used within the system. This is accomplished by setting the energy level per spark and the spark rate generated by the exciter assembly. By setting these parameters within the exciter assembly, the exciter assembly can generate the peak voltage for breaking down the spark gap which is required to ignite the particular "green" fuel that is to be burned. In one embodiment of the present disclosure, the output voltage is about 15 kV, the spark rate is about 100 Hz, and the delivered energy is about 70 mJ. In another embodiment of the present disclosure, the output voltage is about 15 kV, the spark rate is about 260 Hz, and the spark energy is about 50 mJ. In another embodiment of the present disclosure, the output voltage is about 15 kV, the spark rate is about 110 Hz, and the spark energy is about 105 mJ. In another embodiment of the present disclosure, the output voltage is about 15 kV, the spark rate is in the range of about 11 to about 100 Hz, and the spark energy is in the range of about 12 to about 100 mJ. In another embodiment of the present disclosure, the output voltage is in the range of 0.1 kV to 18 kV, the spark rate is in the range about 11 to about 100 Hz, and the spark energy is in the range about 12 to about 100 mJ.

While the spark exciter and corresponding methods have been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the spark exciter should not be limited to any single embodiment, but rather construed in breadth and scope in accordance with the recitations of the appended claims.

What is claimed is:

1. A spark exciter operational unit for a flight system comprising an exciter assembly and an ignitor, wherein the spark exciter operational unit comprises: (1) an input connector for receiving an electrical current and a (2) a DC-DC electrical current converter, wherein the exciter assembly and ignitor generates sparks having a voltage, energy and frequency to reliably initiate ignition and combustion of non-hypergolic green fuels for space flight, wherein the input connector supplies an input voltage to the exciter assembly ranging from about 9 V to about 120 V, wherein the spark exciter operational unit further comprises an output current ranging from about 6 kV to about 25 kV, an output breakdown current supplied to a spark gap within an igniter assembly which is about 15 kV, a spark rate ranging from about 1 to about 300 sparks per second and a spark energy ranging between about 1 mJ to about 115 mJ.

2. The spark exciter operational unit of claim 1,
wherein the exciter assembly comprises a circuit board that receives input power from a power source, a filter to reduce conducted disturbances, a timing circuit, a power converter and a driver,
wherein ignitor comprises a capacitor, a spark plug and a spark gap,
wherein a flyback transformer is positioned between the exciter assembly and the ignitor, wherein the flyback transformer comprises a primary end and a secondary end, wherein the secondary end of the transformer is connected in series with the capacitor and the spark gap and is used to generate a breakdown voltage across the spark gap to ignite the spark plug.

3. The spark exciter operational unit of claim 2, wherein the timing circuit controls the operation and function of the power converter which charges the capacitor within the ignitor and wherein the timing circuit controls the operation and function of the driver which provides an electrical power pulse to the transformer.

4. The spark exciter operational unit of claim 1, wherein the output breakdown current supplied to a spark gap within an igniter assembly is about 15 kV, wherein the spark rate is about 100 sparks per second and wherein the spark energy is about 70 mJ.

5. The spark exciter operational unit of claim 1, wherein the output breakdown current supplied to a spark gap within an igniter assembly is about 15 kV, wherein the spark rate is about 260 sparks per second and wherein the spark energy is about 50 mJ.

6. The spark exciter operational unit of claim 1, wherein the output breakdown current supplied to a spark gap within an igniter assembly is about 15 kV, wherein the spark rate is about 110 sparks per second and wherein the spark energy is within the range of about 12 to about 100 mJ.

7. The spark exciter operational unit of claim 1, wherein the output breakdown current supplied to a spark gap within an igniter assembly is in the range of about 0.1 kV to about 18 kV, wherein the spark rate is in the range of about 11 to about 100 sparks per second and wherein the spark energy is within the range of about 12 to about 100 mJ.

8. The spark exciter operational unit of claim 1, wherein the non-hypergolic fuel that is ignited is a mixture of $LO_2$ and $LCH_4$.

9. The spark exciter operational unit of claim 1, wherein the non-hypergolic fuel that is ignited is a mixture $N_2O$ and Propylene ($C_3H_6$).

10. The spark exciter operational unit of claim 1, the non-hypergolic fuel that is ignited is a mixture of $N_2O$ and Propane $C_3H_8$.

11. The spark exciter operational unit of claim 1, wherein the non-hypergolic fuel is ignited at a pressure in the range of about 1 Torr to about 100 Torr.

12. A method of converting an electrical input within a spark exciter operational unit of claim 1 to an electrical output comprising:
sending an electrical current from a power source to the exciter assembly allowing the circuit board of the exciter assembly to receive an input current which ranges from about 9V to about 120V;
passing the electrical input through the timing circuit within the exciter assembly;
allowing the timing circuit to turn on the power converter;
allowing the power converter to charge the capacitor;
allowing the timing circuit to initiate operation of the driver;
allowing the driver to send an electrical input to the transformer which outputs an electrical current to the ignitor in the range of about 6 kV to about 25 kV.

13. The method of claim 12, wherein the electrical input received from the power source is passed through a filter to reduce conducted disturbances.

14. The method of claim 13, wherein the electrical input is passed through the filter prior to the electrical input being passed through the timing circuit.

15. The method of claim 14, wherein the timing circuit controls the operation and function of the power converter which charges the capacitor within the ignitor and wherein the timing circuit controls the operation and function of the driver which provides an electrical power pulse to the transformer.

16. The method of claim 15, wherein after the capacitor is charged by the power converter, the timing circuit initiates controlled operation of a driver.

17. The method of claim 16, wherein the transformer and capacitor are discharged in conjunction within the ignitor to generate the breakdown voltage across the spark gap to initiate ignition of the spark plug and combustion of the non-hypergolic green fuel.

* * * * *